D. WILLIAMS.
Sled-Propeller.

No. 198,063. Patented Dec. 11, 1877.

WITNESSES:
Francis McArdle,
J. H. Scarborough.

INVENTOR:
D. Williams.
BY Munn & Co.
ATTORNEYS.

UNITED STATES PATENT OFFICE.

DANIEL WILLIAMS, OF WEST PHILADELPHIA, PENNSYLVANIA.

IMPROVEMENT IN SLED-PROPELLERS.

Specification forming part of Letters Patent No. 198,063, dated December 11, 1877; application filed October 29, 1877.

*To all whom it may concern:*

Figure 1:
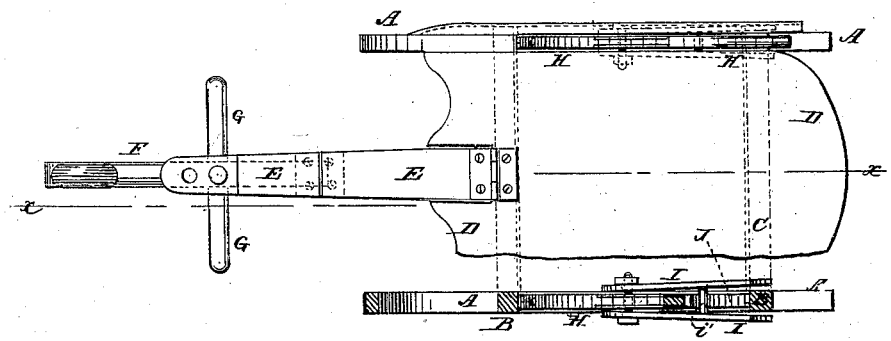
Figure 2:
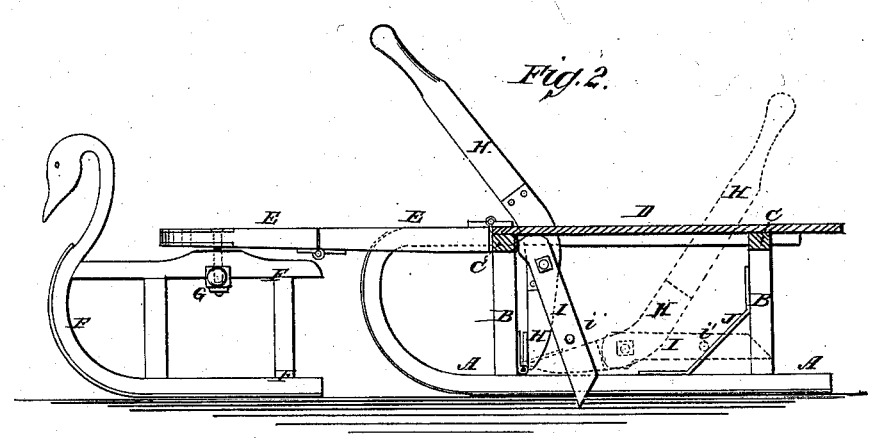

Be it known that I, DANIEL WILLIAMS, of West Philadelphia, in the county of Philadelphia and State of Pennsylvania, have invented a new and useful Improvement in Sled-Propellers, of which the following is a specification:

Figure 1 is a top view of my improved sled-propeller, partly in section, to show the construction. Fig. 2 is a longitudinal section of the same, taken through the line $x\ x$, Fig. 1.

Similar letters of reference indicate corresponding parts.

The object of this invention is to furnish an improved sled which shall be so constructed that it may be propelled by the rider upon level ground, or even upon an up-grade, with a small exertion of power, and which may be easily steered by the rider with his feet.

The invention will first be described in connection with the drawing, and then pointed out in the claims.

A A are the runners, B B are the knees, C C are the beams, and D is the bottom, of the sled, about the construction of which parts there is nothing new.

To the center of the forward beam C is hinged the end of a bar, E, in such a way that the said bar may be turned upward. The bar E is made in two parts, hinged together in such a way that the forward part may be turned downward.

To the forward end of the hinged or flexible bar E is pivoted a third runner, F, to which, directly beneath its pivot, is rigidly attached a cross-bar, G. The ends of the cross-bar G project, so that the rider can rest his feet upon them, and thus steer the sled. With this construction the hinges of the bar E give it such flexibility that the runner F can readily adjust itself to any unevenness of the ground.

To the lower end of the rear side of the forward knees B are hinged the lower ends of the levers H, which pass up at the edges of the bottom D, and have bends formed in them to bring their upper ends into such a position that they can be readily grasped and operated by the rider.

To the opposite sides of each of the levers H are pivoted the forward ends of a pair of dogs, I, which are connected near their rear ends and held parallel with each other by a pin, $i'$. The rear ends of the dogs I are pointed, so that they may readily take hold of hard snow and ice.

To the forward side of the rear knees B, and to the runners A, are attached the ends of inclined braces J, against which, when the levers H are drawn far back, the pins $i$ strike and slide up, raising the dogs I and preventing them from dragging upon the ground. The forward ends of the dogs I project a little above their pivots, so as, when the levers H are pushed far forward, to strike against the forward beam C and the bottom D, to adapt said levers and dogs to serve as brakes to stop the sled, or check its motion upon a down-grade.

Having thus described my invention, I claim as new and desire to secure by Letters Patent—

1. The combination, with runner F, having cross-bar G to receive both feet of rider, and pivoted to flexible bar E, of the sled A B C D, provided with bent levers H, projecting beyond their pivots, and having connected dogs I, the latter held by pins $i'$, as shown and described.

2. The combination of the inclined braces J with the sled, to receive the pin $i$ and raise the dogs I from the ground, substantially as herein shown and described.

DANIEL WILLIAMS.

Witnesses:
 GEORGE GRIFFIN,
 HENRY CLAY CANN.